Nov. 12, 1940.                J. H. VAN UUM                 2,221,009
                            SPRING CLIP DEVICE
                            Filed July 10, 1939

INVENTOR.
JOHN H. VAN UUM
BY
*John H. Van Uum*
HIS     ATTORNEY.

Patented Nov. 12, 1940

2,221,009

UNITED STATES PATENT OFFICE 2,221,009

SPRING CLIP DEVICE

John H. Van Uum, Lakewood, Ohio

Application July 10, 1939, Serial No. 283,623

8 Claims. (Cl. 24—215)

This invention relates to a snap fastener or spring clip device for securing hollow members, such as the usual decorative bead trim or the like, to an apertured support. Due to inherent defects of the spring clip devices, it often happens that in automobile body construction, the decorative bead trim inadvertently becomes removed or loosened and allowed to move in one or more directions, with respect to the support, causing an undesirable rattle of the trim member.

The principal object of the present invention is to provide a spring clip device which may be readily and easily installed into the opening of the trim member and which will engage therein in such a manner as to prevent the trim member from becoming dislodged, loosened or moved in any direction with respect to the supporting member after installation on the support.

Furthermore, in the assembling of spring clip devices of this nature, the customary practice has been first to space the clips a predetermined distance apart within the trim member and then to connect this assembly to the support by inserting the shank portions of the devices in their respective apertures in the support. In many instances, however, due to the inherent defects of the clip, the devices become shifted out of proper position and a readjustment of the devices along the lateral or lengthwise dimension of the trim member was necessary.

It is, therefore, another object of the present invention to provide a spring clip device which may be installed in the trim member preparatory to installation in the support and which will engage the trim member in a manner to prevent lateral shifting of the clips before or during installation.

Another object is to provide a spring clip device in which the stresses of the gripping or retaining action between the head portion of the clip and the trim member to be secured is uniformly distributed along the head portion of the device, and in which the spring action of the head is augmented when the shank portion of the spring clip is inserted in an aperture in the support.

Still another object of the present invention is to provide a one-piece spring clip device in which the end portions of the strip of metal, of which the fastener is formed, terminate within the peripheral limits of the head portions in a manner to prevent intertangling of the devices during shipping, and tangling or snagging during installation, and also are so arranged as to increase the gripping and aligning efficiency of the head.

Another object is to provide a spring clip device having the above mentioned features and which has a head portion which is capable of substantial contraction to allow the head portion of the device to be inserted within the opening of the trim member and to expand thereafter and be firmly secured in place therein.

Another object is to provide a one-piece spring clip device for the general purposes described which can be readily and cheaply formed by the usual quantity production methods and machines.

Other objects and advantages will become apparent from the following specification wherein reference is made to the drawing in which.

Figure 1:
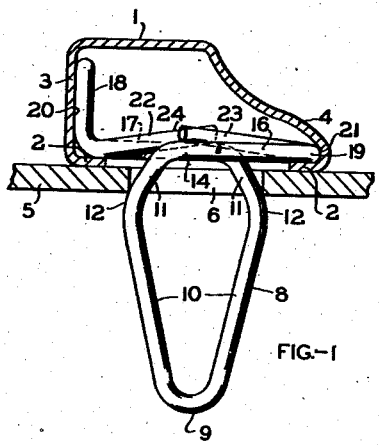
Fig. 1 is a front elevation of a spring clip device embodying the principles of the present invention and installed in operating position with respect to a trim member and support, the trim member and support being shown in section for clearness in illustration.
Figure 2:
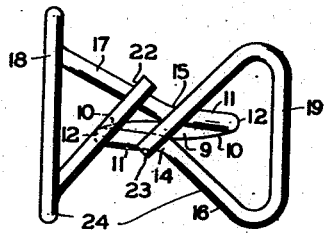
Fig. 2 is a top plan view of the spring clip device illustrated in Fig. 1.
Figure 4:
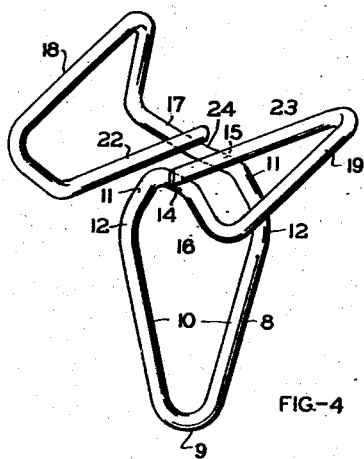
Fig. 4 is a perspective view of the spring clip device illustrated in Fig. 1.

Referring first to Figs. 1 to 4, for purposes of illustration the present spring clip device is shown in connection with the usual hollow trim member 1 having inturned flanges 2 and side walls 3 and 4 mounted upon a support 5 having an aperture 6 therein, the application of the invention to other apertured supports and members to be secured thereto being readily apparent from the illustrative form. The spring clip device indicated generally at 8 comprises a single piece of spring wire formed intermediate its ends to provide a nose 9 with legs 10 extending therefrom and which are spaced from each other and divergent from the nose partway of their length, and convergent more abruptly, as at 11, the remainder of their length, so as to form locking shoulders 12. Beyond each of the convergent leg portions 11 the wire is bent inwardly of the resilient shank or loop portion which is defined by the nose 9 and legs 10 and 11, the wire stretches forming the effective upward terminus of the loop as illustrated in Fig. 1 crossing each other. At said upward terminus of the loop the wire is bent outwardly away from the longitudinal axis of the shank to provide spaced intermediate portions 14 and 15. The intermediate portions 14 and 15, nearer the free ends of the wire, are also bent outwardly, as at 16 and 17, away from the plane of the shank portion and then abruptly inwardly substantially normal to the plane of the shank to provide trim contacting portions 18 and 19, which are substantially parallel and each of which extends substantially equidistantly on each side of the plane of the shank or loop portion. The contacting portions 18 and 19 contact the side walls 3 and 4 of the trim member 1 as at 20 and 21, respectively. The contacting portion 18 is formed to contact a substantial portion of the inner surface of the side wall 3.

The free ends of the wire extend from the contacting portions 18 and 19 inwardly and generally in a direction parallel to each other, as at 22 and 23, and toward the plane of the shank, thus completing the head portion 24 which is centered with respect to the plane of the shank.

As illustrated in Figs. 1 to 4, inclusive, the free end portion 22 of the contacting portion 18 overlies and is buttressed by the portion 15 of the head, and the free end portion 23 of the contacting portion 19 overlies and is buttressed by the intermediate portion 14 of the head. Each of the said free ends terminates within the peripheral limits of the head portion 24 and each side head portion normally urges the inturned flanges of the trim member toward the support under constant yielding pressure, and thus firmly resists any force exerted upon the trim member in a direction normal to the plane of the support when the spring clip device is installed in the trim member.

In the form illustrated, the head portions lie in slightly offset parallel planes and each of the intermediate portions 14 and 15 extends from its associated leg portion edgewise of the shank toward and beyond the opposite leg. Thus, the intermediate portions 14 and 15 are so related to the shank and trim contacting portions and to each other that the contacting portion 19 of the left leg 11 in Fig. 1 is disposed to the right of the spring clip, while the contacting portion 18 of the right leg is disposed to the left of the spring clip. Consequently, when the shank portion of the device is forced into the aperture 6 it is compressed edgewise, that is, along its plane, causing the leg portions to be moved relatively toward each other, and the contacting portions 18 and 19 to be moved relatively away from each other. Due to the fact that the parallel contacting portions 18 and 19 extend, from the intermediate portions 14 and 15 in a plane normal to the plane of the shank, an equal distance on each side of the plane of the shank, the shank portion is centered with respect to the head portion 24 of the device. The shank and head portions thus in centered relationship to each other will cause the stresses, exerted by the spring effect of the shank portion upon the head portion 24, to be equally distributed along the entire length of the contacting portions 18 and 19 when the spring clip device is installed and thus insuring a firm gripping and retaining action between the spring clip device and member to be secured to a support.

Figure 3:
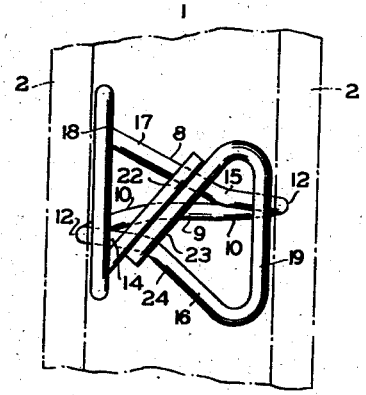
Fig. 3 is a top plan view of a spring clip device showing the head portion in a contracted condition to allow the head portion to be passed between the flanges of the trim member during installation of the device in the trim member, the trim member being shown in broken lines.

In assembling the spring clip device in the trim member 1, the head portion 24 of the clip is first preferably compressed or contracted to the position illustrated in Fig. 3, either by manual force in expanding the shank, or a plurality of clips may be simultaneously conditioned for assembly by the use of a mechanical device such as illustrated and described in my copending application, Serial No. 276,931, filed June 1, 1939. The head portions 24 in their contracted condition are then inserted between the flanges 2 of the trim, as illustrated in Fig. 3, and then the pressure released to allow the head portions to expand toward their original condition, and are arranged to tightly engage the inner faces of the walls 3 and 4 of the trim member to prevent shifting of the device along the lengthwise dimension of the trim member, even when the shank portion of the device is not inserted in the aperture of the device. The device can also be assembled within the trim member by first placing the head portions between the inturned flanges of the trim member in position 90° from the position of the head portion illustrated in Figs. 1 and 3 and then rotating clip 90° to the position illustrated in Fig. 1 to cause the head portion to be cammed into contracted condition to allow the head portion to become engaged within the trim member.

After the device is thus assembled in the trim, the shank portion of the spring clip device is then inserted into the aperture of the support and thereby the legs are urged toward each other, and the contacting portions 18 and 19 are urged against the side walls 3 and 4 of the trim, thus augmenting the gripping and retaining action of the contacting portions, as heretofore described, and the trim is firmly positioned on the support in such a manner to resist movement of the trim in any direction to prevent the trim from becoming dislodged, loosened or separated from the support.

It will be noted that the free end portions 22 and 23 of the device lie within the peripheral limits of the head portion, and the terminal portions of the wire lie closer to the adjacent intermediate portions than the distance measured by the diameter of the wire so as to prevent snagging and intertangling of the devices and surrounding materials, both during shipping of the devices and during their assembly into the trim member. Furthermore, due to the fact that the free end portions 22 and 23 extend substantially parallel to each other, they engage each other along their lengthwise dimension when the head portion is contracted, as illustrated in Fig. 3. Thus, the head portion 24 composes two substantially triangular shaped loops which are movable toward each other in slidable contacting relation, thus allowing the head portion 24 to be more easily and completely contracted than if the termini of the free ends contacted or abutted each other endwise, and compression or contraction of the heads depending solely upon the compression of one closed loop.

Figure 6:
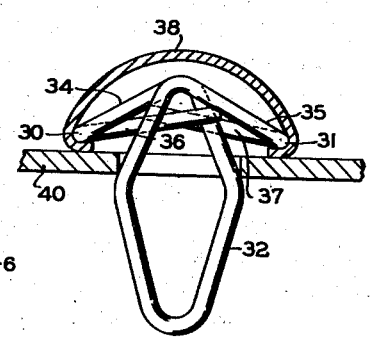
Fig. 6 is a front elevation of the spring clip device illustrated in Fig. 5 in installed operating position with respect to a trim member and support.
Figure 5:
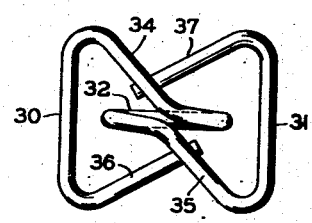
Fig. 5 is a top plan view of a modified form of the device illustrated in Figs. 1 to 4, inclusive.

Referring to the modified form illustrated in Figs. 5 and 6, the substantially parallel contacting portions 30 and 31 are connected to the shank portion 32 of the spring clip device by means of the downwardly and outwardly sloping intermediate portions 34 and 35, respectively, which constitute extensions of the relatively crossed looped terminal portions of the wire composing the shank. The upwardly sloping portion 36 on the free end of one trim contacting portion of the wire overhangs, toward the shank, the intermediate portion 35 and contacts with said intermediate portion and the other free end portion 37 is in similar overhanging contacting relation to the intermediate portion 34, and thereby uniform downward pressure of the trim contacting portions 36 and 31 is secured, as though the four portions 34, 35, 36 and 37 were all uniformly connected with the shank. In other words, the overhanging relationship of the end portions 36 and 37 prevents non-uniform contact of the portions 30 and 31 with the trim which otherwise might result from twisting of the intermediate portions 34 and 35. In this form of clip is provided two substantially triangularly shaped head portions which are symmetrical about the present plane of the shank and which are easily contracted toward each other. In this form, as in the form illustrated in Figs. 1 to 4, inclusive, the contacting portions 30 and 31 extend an equal distance on both sides of the plane of the shank, thus centrally positioning the longitudinal axis of the shank substantially midway between the lengthwise dimension of the heads. The contacting portions 30 and 31 also normally exert a downward pressure forcing the inturned flanges of the trim member 38 toward the apertured support 40.

While, in the forms illustrated, the free ends of the wire terminate within the head portion, it is apparent that the device may be formed in such a manner that they may terminate in a shank portion.

I claim:

1. A spring clip retaining device for securing a member having an opening therein to the outer face of an apertured support comprising a single strip of spring metal having a shank intermediate its ends in the form of a resilient loop, which is compressible and expansible edgewise, locking shoulders on the shank for a yieldable locking engagement with an aperture of the said support, intermediate portions on the ends of said shank beyond the said locking shoulders, parallel work contacting portions on the intermediate portions and defining therewith a head for yieldable locking engagement with the member to be secured, and each trim contacting portion extending a substantial distance on each side of the plane of the shank, the free ends of the said strip of metal beyond the said work contacting portions extending inwardly toward the plane of the shank into buttressed engagement with other portions of the device, and each of the said free ends terminating inwardly of the peripheral limits of the said head.

2. A spring clip retaining device for the purposes described comprising a single strip of spring wire having a shank intermediate its ends in the form of a resilient loop which is compressible and expansible edgewise for yieldable locking engagement with an aperture of a support, intermediate portions on the ends of said shank, parallel trim contacting portions defining with the intermediate portions a head for yieldable locking engagement with opposite walls of a trim member to be secured to the support, each trim contacting portion extending beyond its associated intermediate portion and each extending an equal distance at opposite sides of the plane of the said shank, the free end portions of the said wire strip extending back toward the plane of the shank and each free end portion terminating inwardly of the peripheral limits of the said head, the said free end portions being positioned in parallel relation, with respect to each other, for engaging each other along their lengthwise dimensions for mutually resilient and buttressing relation to each other when the said head is contracted.

3. A spring clip device for securing a trim member having an opening therein to an apertured support and comprising a single strip of spring metal having a portion intermediate its ends in the form of a resilient loop constituting a shank with relatively crossed loop-terminal portions free from each other so that the loop is compressible and expansible edgewise for yieldable engagement with an aperture in the support, intermediate portions comprising continuations of respective loop-terminal portions of the shank and extending from the loop-terminal portions in opposite directions beyond edge portions of the loop, trim contacting portions constituting continuations of respective intermediate portions and extending generally parallel to each other in directions normal to the principal plane of the said loop, each a substantial distance on each side of said plane of the loop.

4. A spring clip device for securing a trim member having an opening therein to an apertured support and comprising a single strip of spring metal having a portion intermediate its ends in the form of a resilient loop constituting a shank with relatively crossed loop-terminal portions free from each other so that the loop is compressible and expansible edgewise for yieldable engagement with an aperture in the support, intermediate portions comprising continuations of respective loop-terminal portions of the shank and extending from the loop-terminal portions in opposite directions beyond edge portions of the loop, straight trim contacting portions constituting continuations of respective intermediate portions and extending generally parallel to each other in directions normal to the principal plane of the said loop, each approximately an equal distance on each side of the plane of the loop.

5. A spring clip retaining device for securing a member having an opening therein to the outer face of an apertured support, said clip comprising a single strip of spring wire having a shank to engage an aperture of such support, said shank comprising a resilient loop intermediate the ends of the wire, said loop having mutually adjacent loop-terminal portions free from each other so that the shank is compressible and expansible edgewise toward and away from the axis of the aperture with which the shank is engaged, locking shoulders on the shank for a yieldable locking engagement with said aperture of the support, a work engaging head including intermediate portions of the wire constituting extensions of respective loop-terminal portions directed laterally of the axis of the engaged aperture, said head also including work contacting portions constituting continuations of respective intermediate portions and extending from the outward extremities of the intermediate portions in directions substantially normal to the principal plane of said loop, and said head also including free ends of the said work contacting portions, each of said free ends terminating adjacent one of the aforesaid portions of the wire a less distance therefrom than the diameter of the wire.

6. A spring clip retaining device for the purposes described comprising a single strip of spring metal having a shank portion intermediate its ends in the form of a resilient loop which is compressible and expansible edgewise for yieldable engagement with an aperture of a support, intermediate portions on the ends of the shank portion directed laterally with respect to the axis of such aperture when engaged by the shank, parallel trim contacting portions constituting continuations of said intermediate portions, respectively, each of said trim contacting portions extending generally in a direction transversely with respect to the plane of the shank portion and extending normal to such axis of the engaged aperture, the free end of each of the trim contacting portions extending back in a direction toward the plane of the shank and relatively underhanging, toward the shank portion, the intermediate portion which is associated with the other trim contacting portion.

7. A spring clip retaining device for the purposes described comprising a single strip of spring metal having a shank portion intermediate its ends in the form of a resilient loop which is compressible and expansible edgewise for yieldable engagement with an aperture of a support, intermediate portions on the ends of the shank portion, respectively, said intermediate portions being directed laterally with respect to the axis of such aperture when engaged by the shank, parallel work contacting portions constituting continuations of said intermediate portions respectively, each of said trim contacting portions extending generally in a direction transversely with respect to the plane of the shank portion and extending normal to such axle of the engaged aperture, the free end of each of the trim contacting portions extending back in a direction toward the plane of the shank and relatively underhanging, toward the shank, one of said intermediate portions.

8. A spring clip retaining device for the purposes described and comprising a single strip of spring metal and having a shank portion intermediate its ends in the form of a resilient loop which is compressible and expansible edgewise for yieldable engagement with an aperture of a support, intermediate portions comprising continuations of respective loop-terminal portions of the shank portion, parallel work-contacting portions comprising continuations of respective intermediate portions, each intermediate portion diverging from the plane of the shank in a direction toward its associated work-contacting portion, each work contacting portion extending from its associated intermediate portion in a direction back toward and beyond the plane of the shank, and free end portions constituting continuations of the work-contacting portions, each free end portion extending in a direction back toward and converging relative to the plane of the plane of the shank and extending close to one of said intermediate portions adjacent the shank.

JOHN H. VAN UUM.